United States Patent [19]

Shupe et al.

[11] Patent Number: 5,290,389
[45] Date of Patent: Mar. 1, 1994

[54] FIBER PLACEMENT DELIVERY SYSTEM WITH MODULAR CUT/ADD ACTUATORS

[75] Inventors: Keith G. Shupe, Bountiful; Boyd L. Hatch, Salt Lake City, both of Utah

[73] Assignee: Hercules Incorporated, Wilmington, Del.

[21] Appl. No.: 948,626

[22] Filed: Sep. 21, 1992

Related U.S. Application Data

[63] Continuation of Ser. No. 630,083, Dec. 19, 1990, abandoned.

[51] Int. Cl.$^5$ .............................................. B65H 81/00
[52] U.S. Cl. .................................... 156/425; 156/433; 156/523; 156/574; 156/353; 156/361
[58] Field of Search ............... 156/173, 175, 169, 166, 156/425, 429, 430, 433, 544, 523, 574, 353, 361 577

[56] References Cited

U.S. PATENT DOCUMENTS

| | | |
|---|---|---|
| 2,596,162 | 5/1952 | Muskat . |
| 2,683,105 | 7/1954 | Forbes et al. . |
| 3,025,205 | 3/1962 | Young . |
| 3,313,670 | 4/1967 | Sherwood . |
| 3,574,040 | 4/1971 | Chitwood et al. . |
| 3,616,070 | 10/1971 | Lemelson . |
| 3,616,078 | 10/1971 | Howard . |
| 3,694,927 | 10/1972 | Sorenson . |
| 3,723,157 | 3/1973 | Durin . |
| 3,737,352 | 6/1973 | Avis et al. . |
| 3,775,219 | 11/1973 | Karlson et al. . |
| 3,819,461 | 6/1974 | Saffadi . |
| 3,970,831 | 7/1976 | Hegyi ............................. 156/363 X |
| 4,145,740 | 3/1979 | McClean et al. . |
| 4,168,194 | 9/1979 | Stiles . |
| 4,221,619 | 9/1980 | Lemons . |
| 4,292,108 | 4/1981 | Weiss et al. ..................... 156/353 X |
| 4,351,688 | 9/1982 | Weiss . |
| 4,382,836 | 5/1983 | Frank . |
| 4,461,669 | 7/1984 | Dontschef . |
| 4,508,584 | 4/1985 | Charles . |
| 4,531,998 | 7/1985 | Peterson . |
| 4,557,790 | 12/1985 | Wisbey . |
| 4,569,716 | 2/1986 | Pugh . |
| 4,591,402 | 9/1986 | Evans et al. . |
| 4,610,402 | 9/1986 | Corbett et al. . |
| 4,699,683 | 10/1987 | McCowin . |
| 4,790,898 | 12/1988 | Woods . |
| 4,797,172 | 1/1989 | Hebert et al. . |
| 4,799,981 | 1/1989 | Stone et al. . |
| 4,822,444 | 4/1989 | Weingart et al. . |
| 4,867,834 | 9/1989 | Alenskis et al. . |
| 4,872,619 | 10/1989 | Vaniglia . |

(List continued on next page.)

FOREIGN PATENT DOCUMENTS

| | | |
|---|---|---|
| 198744 | 10/1986 | European Pat. Off. . |
| 2300816 | 1/1973 | Fed. Rep. of Germany . |
| 3223231 | 6/1982 | Fed. Rep. of Germany . |
| 32216290 | 7/1982 | Fed. Rep. of Germany . |
| 61-160836 | 7/1986 | Japan . |
| 9007428 | 7/1990 | PCT Int'l Appl. . |

OTHER PUBLICATIONS

Fiber Placement Process Study; Evans, D. O. et al.; May 8-11, 1989; Today, Society for the Advancement Material and Process Engineering; vol. 34-II, pp. 1822-1833.

N/C Tape Laying-Tomorrow's Future Today; Goldsworthy; Western Metal and Tools Conference, Society of Manufacturing Engineers; Mar. 11-15, 1974.

(List continued on next page.)

Primary Examiner—Jeff H. Aftergut
Attorney, Agent, or Firm—Robert O. O'Brien

[57] ABSTRACT

A delivery head is adapted for use in a fiber placement system for laying a plurality of tows, forming a band, onto a mandrel to form an irregular shaped object. The delivery head has cut and add sections and includes a plurality of pathways for guiding a respective plurality of tows from an inlet to an outlet of the delivery head. The cut and add section is provided in the form of a module which includes apparatus for selectively actuating any of a plurality of cutting elements and for selectively actuating any of a plurality of advancing devices for advancing respective ones of the tows toward the outlet of the delivery head.

29 Claims, 11 Drawing Sheets

U.S. PATENT DOCUMENTS

| | | |
|---|---|---|
| 4,877,193 | 10/1989 | Vaniglia . |
| 4,877,471 | 10/1989 | McCowin et al. . |
| 4,907,754 | 3/1990 | Vaniglia . |
| 4,943,338 | 7/1990 | Wisbey . |
| 5,015,326 | 5/1991 | Frank ........................... 156/361 X |
| 5,022,952 | 6/1991 | Vaniglia . |
| 5,045,147 | 9/1991 | Benson ......................... 156/425 X |
| 5,078,592 | 1/1992 | Grimshaw et al. . |
| 5,104,474 | 4/1992 | Scola et al. . |
| 5,110,395 | 5/1992 | Vaniglia ........................ 156/175 X |

OTHER PUBLICATIONS

Contoured Tape Laying; Engineered Materials Handbook; vol. 1 pp. 631–635.

Grimshaw et al., "Automated Tape Layup of a BMI Vertical Stabilizer Skin", 15–17 Sep. 1987, pp. 173–182.

Klein, Allen J., "Automated Tape Laying", *Advanced Composites*, Jan./Feb. 1989, pp. 44–52.

Cincinnati Milacron, "Into The Future . . . With Better Ways to Automate the Manufacture of Composite Parts".

D. V. Rosato et al., "Filament Winding: its development, manufacture, applications, and design", pp. 103–109 (Interscience Publishers 1964).

M. E. Rosheim, "A New Pitch–Yaw–Roll Mechanical Robot Wrist Activator", Jun., 1985, Society of Manufacturing Engineers, vol. 2.

R. Merritt, "Industrial Robots: Getting Smarter All the Time", Instruments & Control Systems, p. 32 (Jul. 1982).

Milacron Today, "Fiber Placement: Automating Complex Composite Parts Processing", vol. 4, No. 6 (Jun. 1989).

The Ingersoll brochure entitled "Automated Machinery for Composite Manufacturing", 1989.

W. O. Sunafrank et al., *"Development of Composite Tape Laying Process for Advanced Fibrous Reinforced Composite Structures"*, Mar. 1971.

Cincinnati Milacron/General Dynamics, *Tape Laying*.

Hercules Incorporated, *Fiber Placement, the Key Technology for Affordable High Performance Structures*, Jan. 1990.

FIG. 14

FIBER PLACEMENT DELIVERY SYSTEM WITH MODULAR CUT/ADD ACTUATORS

This application is a continuation of application Ser. No. 07/630,083, filed Dec. 19, 1990, now abandoned.

BACKGROUND OF THE INVENTION

1. Field of the Invention

The present invention is related to a filament placement system having a head for applying filaments to a mandrel for forming tubular articles.

2. Description of Background and Other Information

In present filament winding systems, fibrous rovings or tows, impregnated with a thermosetting resin, are wound in a helical pattern in a number of superimposed layers onto a mandrel to produce a tubular article. In most types of filament winding operations, the rovings pass through a delivery eye or from a delivery roller across an air space onto the part. In such systems, tows cannot be added or deleted during operation to adjust to the varying contours of the part being wound. Furthermore, such systems are limited to geodesic or natural path fiber patterns. Conventional tape laying systems generally provide positioning of the rovings on flat or slightly contoured surfaces. However, these systems cannot wind three dimensional contours without fiber gaps or overlaps, unless an impracticably narrow band is employed. Tape layers cannot vary the band width without terminating the entire band.

The inability to alter bandwidth while winding parts with non-uniform cross-section, such as fuselages, tapered wing skins, domes or missile nose cones, results in overlapping or gapping of the winding band. The inability to accurately place fiber at the optimum angle results in heavier than necessary designs. In some cases, this results in a design that cannot be automated and provides no cost or weight savings compared to a corresponding metal part.

Co-pending application Ser. No. 07/275,313, filed Nov. 23, 1988, now U.S. Pat. No. 5,045,147 discloses a fiber placement system that overcomes many of the disadvantages of filament winding systems. The system disclosed therein is capable of selecting any or all of thirty-two available tows and terminating and adding them on the mandrel tooling upon computer command. This system allows for the band width to be automatically varied between one and thirty-two tows, and also allows for a full band termination and restart.

A limitation of this design has been encountered due to the cable actuation system utilized for the cutting and adding device. The actuation system of this design consists of remotely located pneumatic cylinders linked to flexible cables which transmit the mechanical force to the delivery head. This cable system has been found to restrict the actuation speed, which can be critical particularly in the cutter mechanism. The presence of the cable system also makes delivery head change-out slow and difficult.

A more desirable delivery head would have an actuation method that would facilitate head installation and removal and, at the same time, providing faster actuation speeds. The delivery head would also be easy to disassemble and clean, thereby reducing down-time.

An additional limitation of the known design has been found to be fiber buildup at the groove openings of the guide trays. In the known design, there had been sharp corners that would tend to catch the tows and cause buildup.

THE INVENTION

In view of the foregoing, an object of this invention is to provide a fiber placement delivery system with a head, generally of the type described in co-pending application Ser. No. 07/275,313, now U.S. Pat. No. 5,045,147 but having simpler and faster actuation methods, while reducing machine down-time.

In accordance with this invention, a pneumatically powered actuation module is provided directly on the delivery head. This pneumatic module incorporates small air cylinders, preferably at individual cutter and individual add roller locations. The module is mounted directly to the delivery head with quick release levers to facilitate head disassembly and cleaning. The air supply lines are equipped with multitube quick connects to simplify head removal or change-out.

Further according to this invention, the guide tray is relocated to provide an equal angle fiber path. Both top and bottom fiber paths enter the tray at the same angle, thereby equalizing tension and fiber wrap around the ribbonizers. The guide trays are also designed to reduce fiber buildup at the groove openings. A smooth radius is formed on the sides of each groove to reduce fiber buildup. The present invention also utilizes a synergistic hard chrome Teflon ® polytetrafluoroethylene impregnated surface on the fiber guide trays. This coating reduces buildup of fiber residue and facilitates head cleaning.

Still further, the present invention uses a totally enclosed chain drive mechanism to transmit torque from the add motor to the add rollers. This drive mechanism is mounted to the head with a single quick release knob. Removal time of the drive mechanism for servicing is reduced from 3–4 minutes to just a few seconds. The new drive also reduces stress on the coupling shaft bearings which to avoid premature failing.

The drive mechanism of the present invention incorporates a new motor that has a built-in tachometer to monitor the motor speed and provide feedback to a synchronization control system.

Preferably according to the present invention, a tachometer is linked to the delivery roller to monitor the fiber lay-down speed. By using this tachometer and a control system, the speed at which tows are driven out of the head can be synchronized with the fiber lay-down speed. A tachometer can also be linked to the motor of the add rollers to monitor the speed of the motor for providing such synchronization with the delivery roller.

It is also contemplated to utilize, instead of tachometers for synchronizing the speed of the drive motor of the add rollers to the speed of the delivery roller, a position encoder to thereby monitor the position of the delivery roller to control the drive motor.

In view of the foregoing, the present invention is directed to a fiber placement system using a cut/add delivery head for winding a plurality of tows forming a winding band onto a mandrel to form an irregular shaped object, the cut/add delivery head including:

(a) a plurality of pathways for guiding a respective plurality of tows from an inlet to an outlet of the delivery head;

(b) means for selectively cutting each of the plurality of tows;

(c) means for advancing the plurality of tows toward the mandrel; and (d) a cut/add actuation module including (i) means for selectively actuating the means for selectively cutting each of the plurality of tows and (ii) means, in conjunction with the means for advancing, for effecting selective adding of the plurality of tows.

According to one aspect of the invention, quick-release hand levers are provided for securing the cut/add actuation modules to the head. Prior to securing the cut/add modules to the delivery head, the modules are located thereon by means of locating pins, for example, although other means to locate are contemplated, as well.

More specifically according to the present invention, the means for selectively cutting each of the plurality of tows includes a plurality of knives positioned for selective movement toward respective ones of the plurality of tows, the means for selectively actuating the means for selectively cutting each of the plurality of tows include a plurality of air cylinders positioned for selective actuation of respective ones of the plurality of knives.

According to another aspect of the invention, the plurality of knives including a cutter assembly module positioned between the tows and the cut/add module.

Still further according to the invention, the means for advancing the plurality of tows include a driven roller, the means for effecting selective adding of the plurality of tows include a plurality of camming members and a respective plurality of air cylinders positioned for selective movement of the camming members toward the driven roller.

Further according to the invention, the camming members include pinching rollers mounted in respective pivotally mounted brackets, the brackets being selectively movable toward the driven roller for pinching selective tows between respective ones of the pinch rollers and the driven roller.

Preferably, according to the invention, each of the air cylinders is powered through flexible tubes attached by means of quick release connectors.

In a particular aspect of the invention, the cut/add actuation modules are adapted to be moved away from the tows, while the tows extend through the head, without requiring movement of the tows, means for cutting, and means for advancing.

Also according to the invention, tow pinch module is provided, including a plurality of air cylinders removable as a unit from said head.

Further according to the present invention, a guide tray is provided having a plurality of grooves for guiding respective ones of the plurality of tows. The grooves have rounded and smooth entrances and are preferably covered with a Teflon impregnated hard chrome coating.

Still further, the guide tray includes an upper portion and a lower portion, spaced from the upper portion at the inlet of the head, the upper portion and the lower portion converging toward the outlet.

According to a still further aspect of the invention, the upper portion of the tray and the lower portion of the tray are equal in length and are adapted to receive the tows at equal angles. A respective the cut/add actuation module is mounted upon each of the upper portion and the lower portion of the tray.

Further, the upper portion of the tray and the lower portion of the tray are unitary.

Still further, the means for advancing the plurality of tows include a roller driven by a drive module affixed to the head by means of a single quick release knob.

Still further according to this aspect of the invention, a threaded stud is provided which projects from the head, the drive module further including a housing affixed to the head by means of the quick release knob being threaded on the stud.

Still further, a delivery roller is provided which is linked to a tachometer for monitoring speed of fiber placement upon the mandrel.

Additionally, the drive module further includes a drive motor and a controller for the drive motor, the controller adapted to synchronize speed of the drive motor to speed of the delivery roller as a function of signals received from the tachometer.

Further, a second tachometer can be provided which is linked to the drive motor for monitoring speed of the motor.

As stated above, alternatively, a position encoder can be provided for monitoring rotary position of the delivery roller. Further, a drive motor controller can be provided for the drive motor, the controller adapted to control the speed of the drive motor as a function of signals received from the position encoder.

BRIEF DESCRIPTION OF THE DRAWING

The above and additional objects, characteristics, and advantages of the present invention will become apparent in the following detailed description of preferred embodiments, with reference to the accompanying drawing which is presented as a non-limiting example, in which.

DETAILED DESCRIPTION OF THE PREFERRED EMBODIMENT

Figure 1:
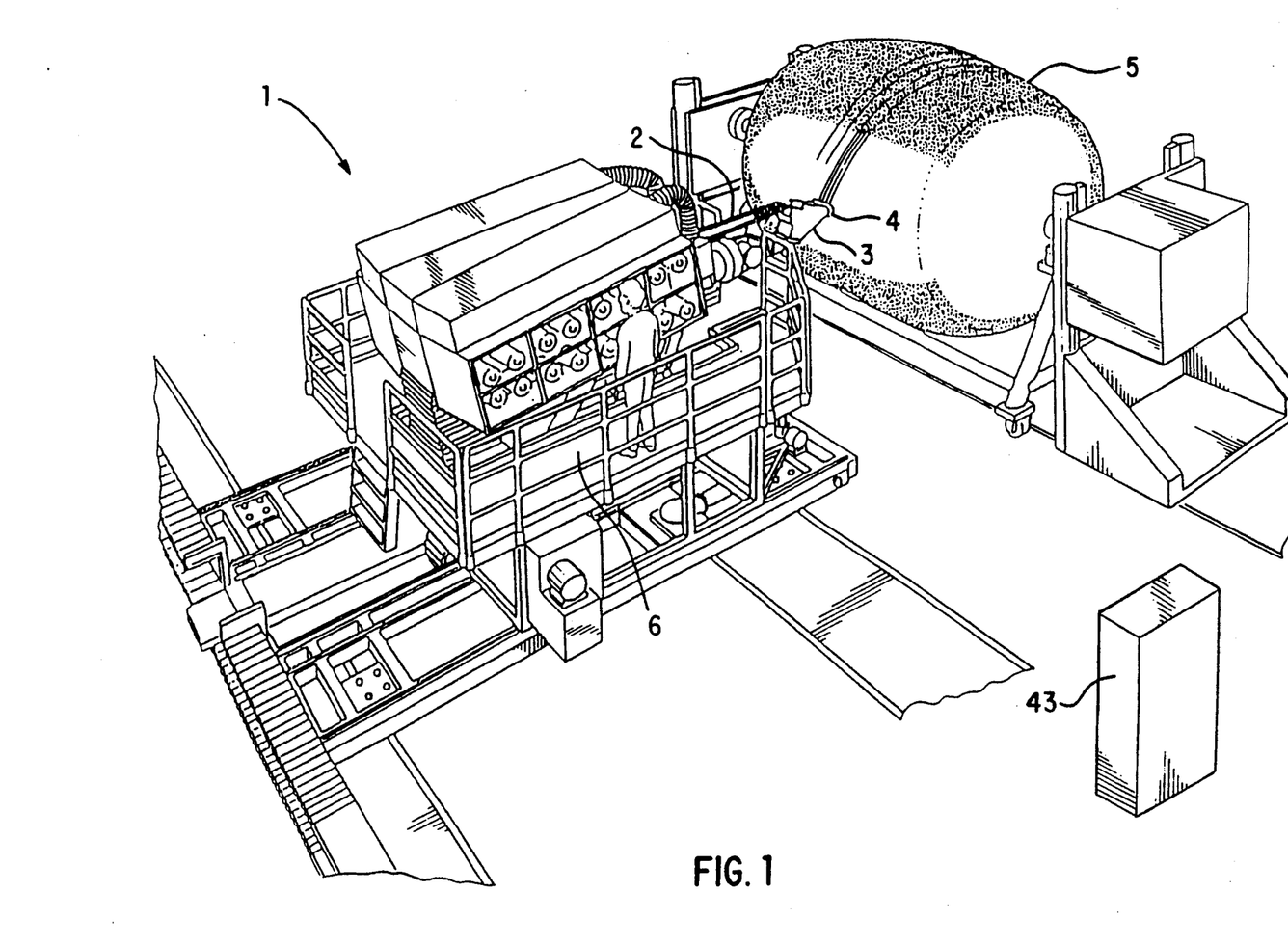
FIG. 1 is rear-side isometric view of a filament delivery system and a mandrel around which the filament is applied by means of the present invention.

FIG. 1 illustrates a fiber placement system 1 in which individual rovings or tows 2 are directed to a delivery head 3, which is mounted onto a manipulator, and emerge at a delivery roller 4. The delivery roller applies the tows, formed into a band 7, shown in FIG. 2, onto a rotating mandrel 5. The fiber placement machine 6 includes a creel assembly for maintaining individual spools upon which the individual tows are wound, from which they are directed to the delivery head. Operation of the machine 6, including the delivery head 3, is controlled by a computer 43.

The manipulator upon which the delivery head is mounted can be of any known construction suitable so as to maintain the delivery head properly positioned with respect to the mandrel around which the tows are to be wound, including irregularly shaped mandrels. For example, the manipulators mentioned in U.S. Pat. No. 4,867,834 and Ser. No. 07/275,313, now U.S. Pat. No. 5,045,147 the disclosures of which are hereby incorporated by reference thereto, would be suitable. In addition to what is known as a roll-roll-roll wrist, a roll-pitch-roll or a roll-pitch-yaw wrist can be used, depending upon the freedom of movement necessary, based upon computer modeling, for example.

The delivery head disclosed herein can also be used in conjunction with the fiber placement system described in copending application Ser. No. 630,137, filed concurrently herewith.

Figure 2:
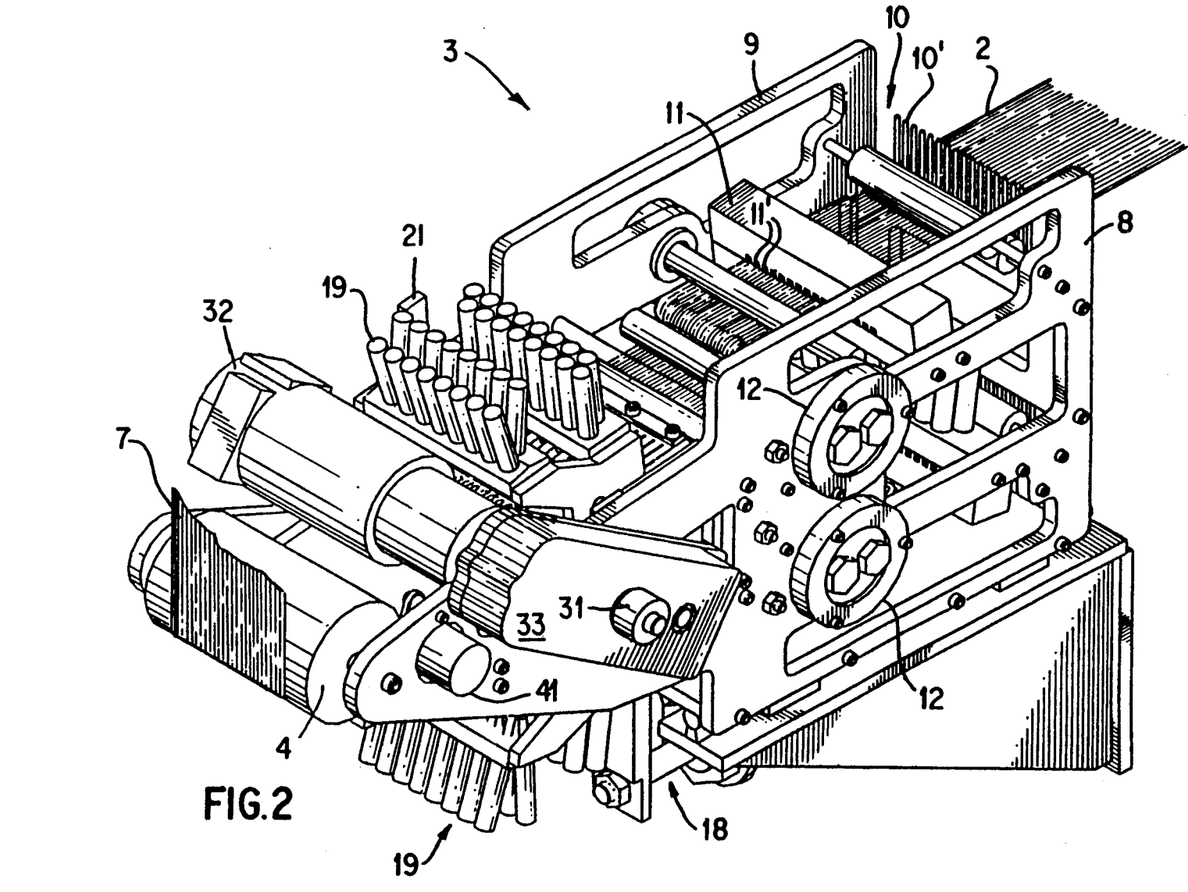
FIG. 2 is a front-side isometric view of the delivery head assembly used on the fiber placement machine.

As shown in FIG. 2, the individual tows 2, which form the winding band 7 which is wound upon the mandrel, pass through different sections of the fiber placement head 3. These sections which are mounted to a chassis, including frame side plates 8, 9 of the head, and include an entry guide section 10, having comb-like teeth 10', shown in FIGS. 2, 3, and 4, e.g., where the individual tows are held separate from each other as the tows are fed into the delivery head. As they enter the delivery head, the tows 2 pass between the nip of a pair or redirect rollers 44, 45 to maintain the tows in their properly spaced orientation. Each roller 44, 45 preferably includes a groove in the surface thereof for accommodating a respective tow.

Figure 4:
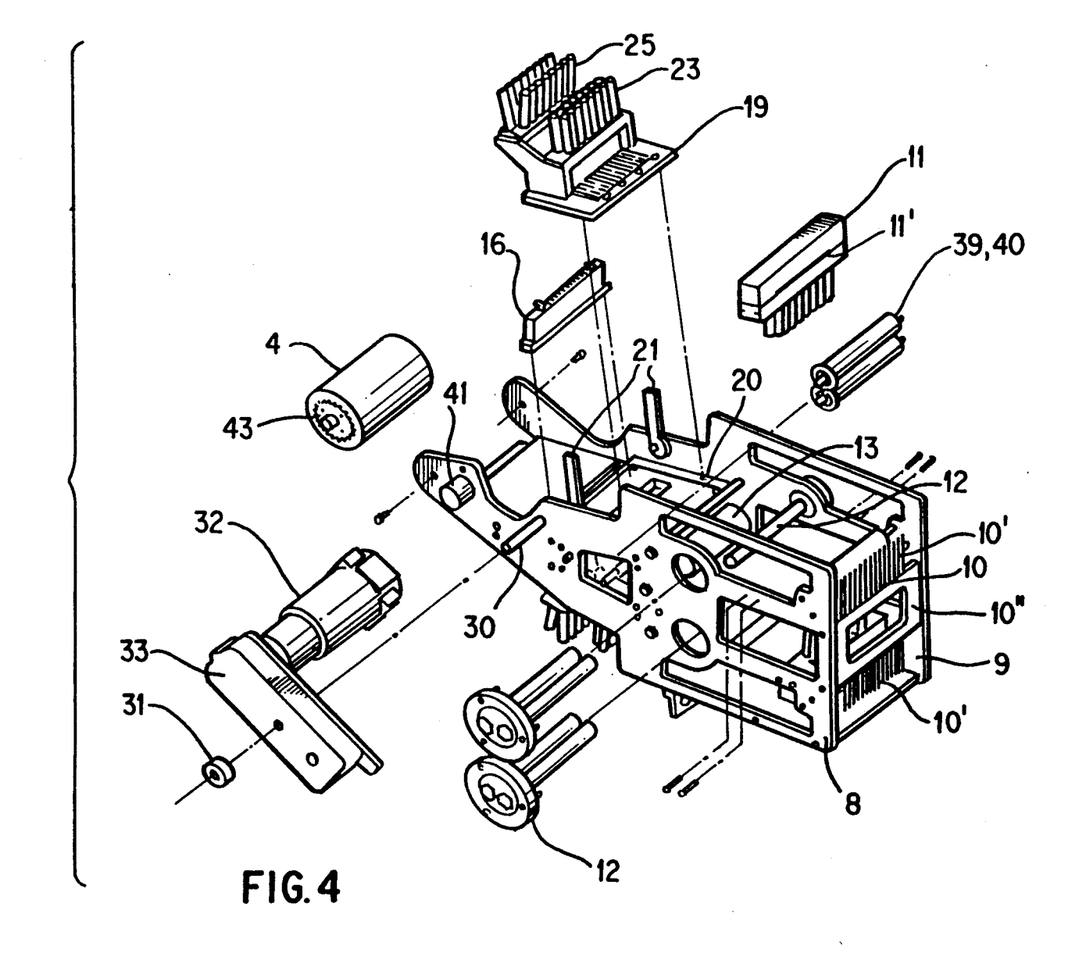
FIG. 4 is an exploded rear-side isometric view of the delivery head assembly.
Figure 9:
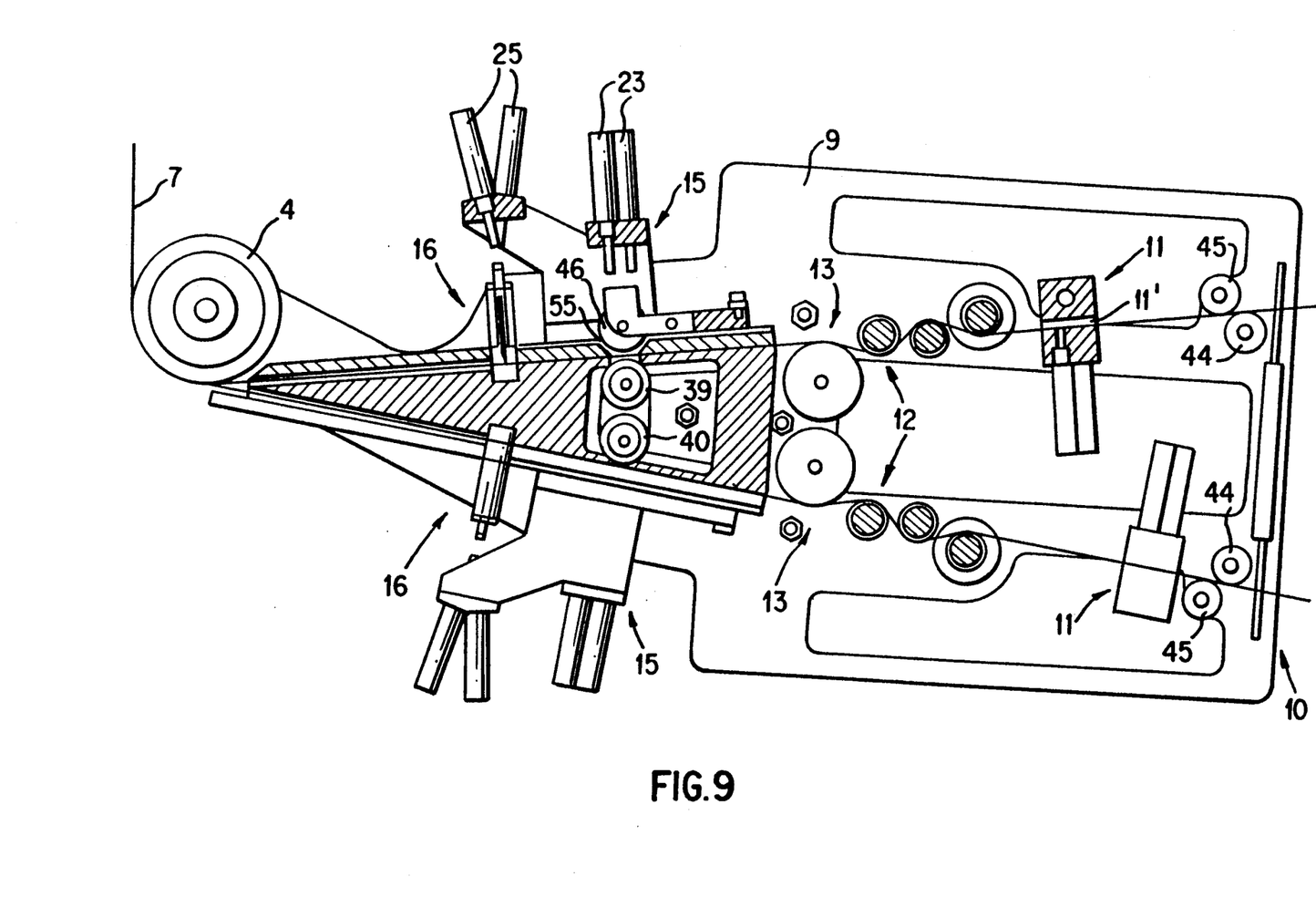
FIG. 9 is a side elevation view, in partial section, of the delivery head with a side plate removed.

As shown in FIGS. 4 and 9, e.g., the various sections of the delivery head of the present invention include upper and lower assemblies, in the general form disclosed in application Ser. No. 07/275,313 now U.S. Pat. No. 5,045,147 so that, e.g., thirty-two tows can be utilized in forming the fiber band 7 being placed upon the mandrel, sixteen extending through the upper assembly and sixteen extending through the lower assembly.

Following the redirect rollers 44, 45, the next section, in a direction from the inlet to the outlet of the head, includes a pinch device 11 to hold the cut tows and prevent them from being pulled out the back of the head during placement or from the induced tension in the creel take-up device. The pinch device preferably comprises a plurality of air-actuated cylinders which are positioned adjacent respective tows. As shown in FIGS. 2, 3, 4, and 9, the pinch device includes individual slots 11' within which the tows are threaded, the individual air-actuated cylinders extending, when actuated, within the slots for engagement with the individual tows.

The pinch device 11 is modular, being removable from the head as a unit, as depicted in FIG. 4, and is intended to replace the spring-biased cams in the aforementioned apparatus of application Ser. No. 07/275,313 now U.S. Pat. No. 5,045,147. Upon receiving a signal from the central computer 43, e.g., in response to a particular tow being cut, or in response to a particular plurality of tows being cut, the appropriate cylinders are actuated by means of air pressure delivered via respective conduits, not shown, to grip the respective tow(s), thereby preventing such tow(s) from backing out of the delivery head.

The fiber tows pass next to the preheating, or ribbonizing, section 12, as shown in FIGS. 2, 3, 4, 8, and 9, e.g., where they are ribbonized or spread to a desired width and thickness before passing to a chilling section 13. The pre-heating and chilling sections are not described further and can be generally of the type disclosed in application Ser. No. 07/275,313, now U.S. Pat. No. 5,045,147 the disclosure of which is hereby incorporated by reference for this purpose. In addition, the ribbonizer as described in copending application Ser. No. 630,217, filed concurrently herewith, can also be utilized.

Figure 3:
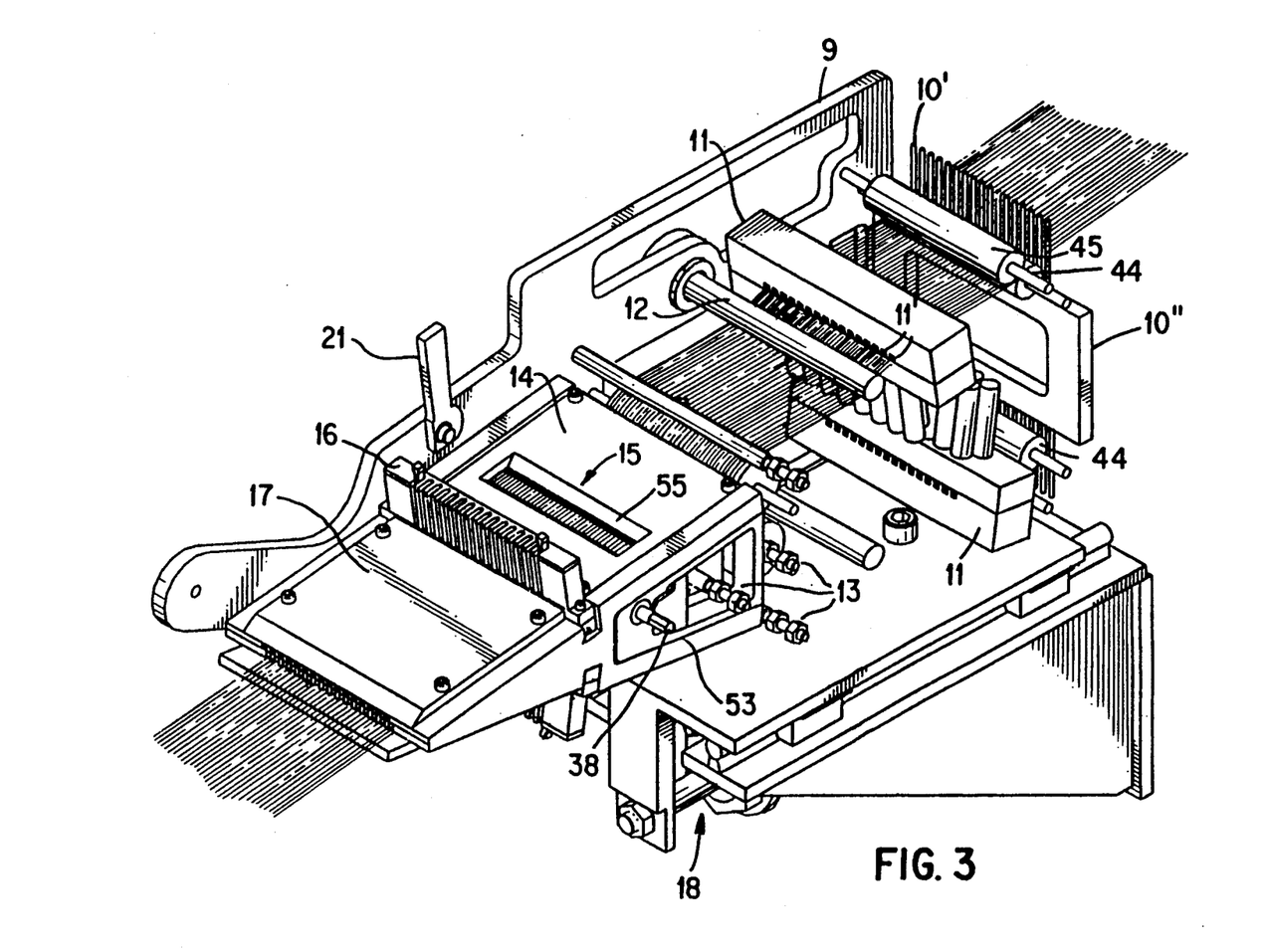
FIG. 3 is an exploded-partial section view of FIG. 2.

Next, as shown in FIG. 3, the tows 2 enter the rear portion 14 of the guide tray, with both top and bottom portions being at equal angles with the tray, receiving the upper tows and the lower tows at equal angles. In addition to the equalization of the aforementioned angles, the tension fiber paths for both the upper and lower portions of the tray are equalized. The tows 2 pass through an add section 15 and then to a cut section 16, which are further described below. In order to avoid misalignment between the upper and lower portions, the upper and lower portions of the guide tray are made unitary, i.e., from a single piece, as shown in FIG. 9, for example.

Following the cut section 16, the tows 2 pass through the remainder of the guide tray and emerge from the front portion 17 of the tray, to the delivery roller 4, shown in FIGS. 2, 4, and 9, for application onto the mandrel 5. By means of the aforementioned manipulator, the delivery head 3 can be moved, e.g., in six axes of movement. In addition, a reciprocating mechanism 18, shown in FIGS. 2 and 3, is provided for movement of the head toward and away from the mandrel 5.

Figure 7:
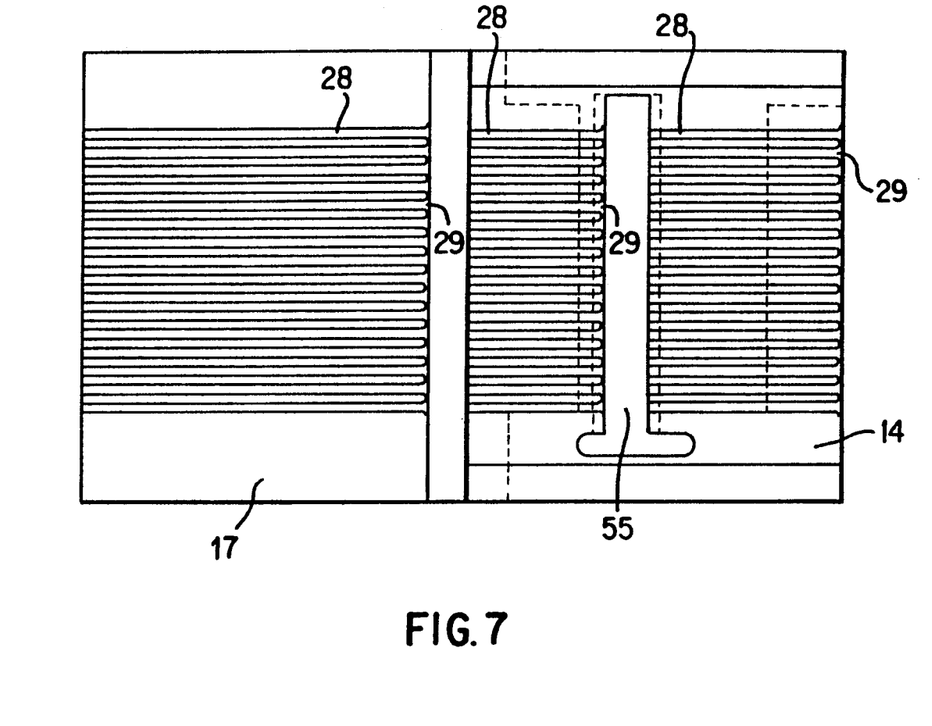
FIG. 7 is a top view of the fiber guide tray.
Figure 8:
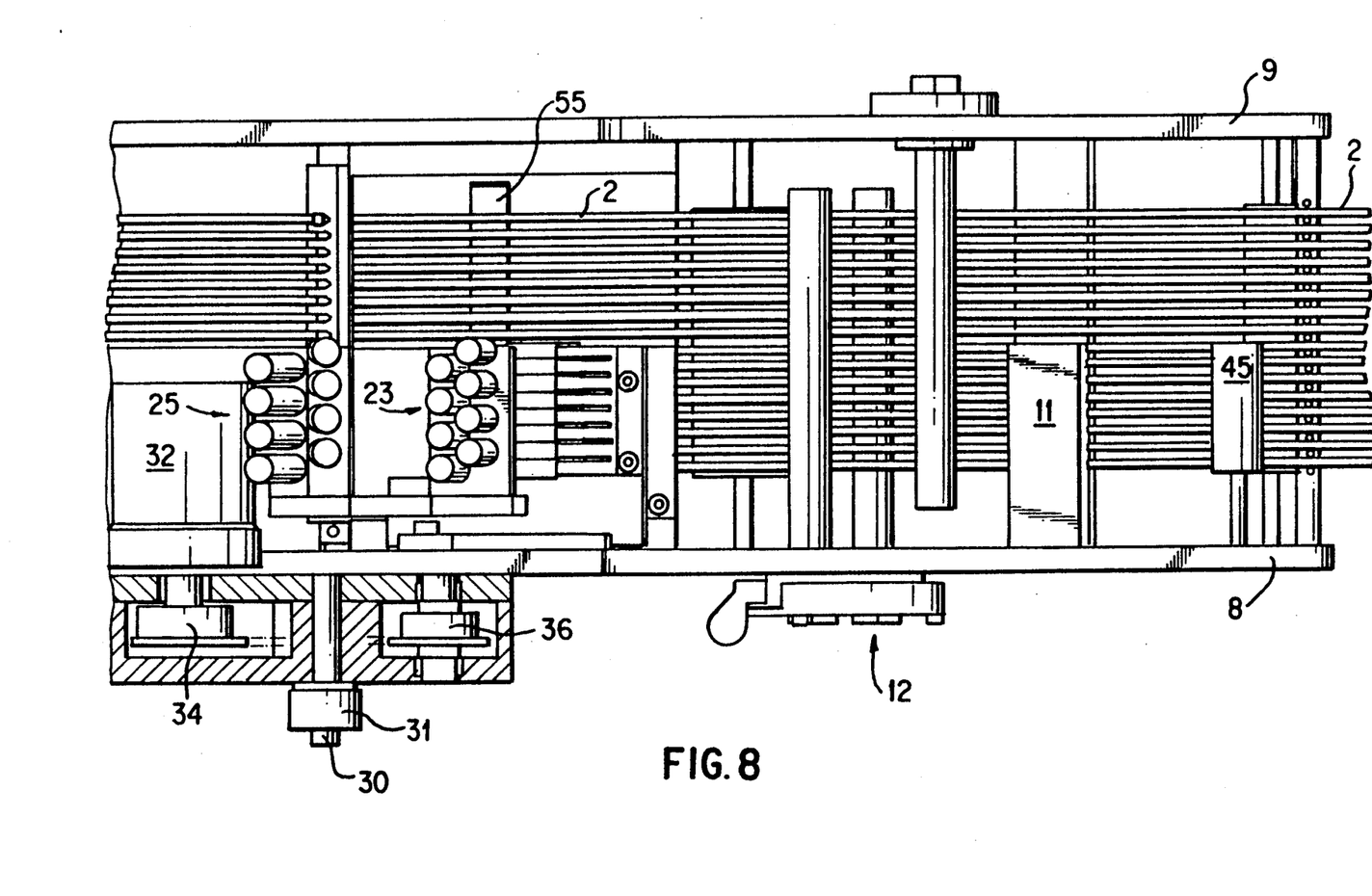
FIG. 8 is a top view of the delivery head, illustrating the plurality of tows, with certain parts of the delivery head shown broken-away for the sake of clarity.

In both the upper and lower portions of the tray, cover plates are positioned to maintain the tows in their respective grooves. In FIG. 7, the individual grooves 28 of the guide tray are shown, the aforementioned covers having been removed. The entry point 29 of each guide groove or groove section incorporates smooth, rounded side walls to reduce fiber buildup. In addition, the guide tray plates at the front 17 and rear 14 of the tray are covered with a Teflon ® polytetrafluoroethylene impregnated hard chrome coating to reduce resin transfer from the rovings and to facilitate cleaning.

As shown in FIG. 3 and the exploded view of FIG. 4, e.g., the delivery head 3 comprises of several operating modules mounted to side plates 8, 9. The pneumatically powered actuation module 19 is located on the guide tray by means of locating pins 20, for example, insertable into respective apertures 20' in the base of the module 19. Other means could be used for such location of the actuation module, as well, if desired. Upon being located on the head, the module is held in place by quick release levers 21, which have lower eccentric cam portions rotatable about a horizontal axis. That is, after placement of the actuation module on the rear guide tray plate 14 by means of the locating pins 20, the quick release levers 21 are rotated to engage the lower cam portions upon the base 22 of the actuation module 19.

Figure 5:
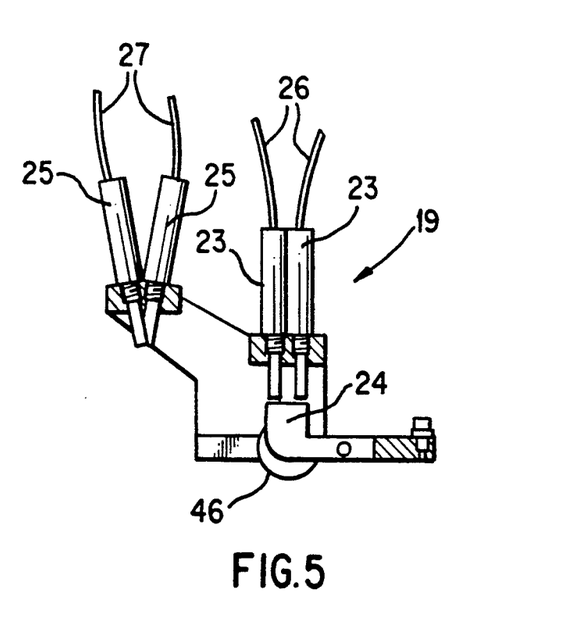
FIG. 5 is a side view of the pneumatically powered actuation module and add pinch roller.

FIGS. 5 and 9 show a side view of the actuation module 19, with add air cylinders 23 acting above respective add roller support brackets 24, supporting add rollers 46. An add roller 46 is provided each tow. By means of the selective actuation of an air cylinder 23, a respective add roller 46 is forced in the direction of opening 55 in the tray toward the continuously driven roller, 39, e.g., between which a tow is positioned, thereby engaging and advancing the tow toward the outlet of the delivery head.

After the newly added tow advances sufficiently to contact the mandrel 5, the add roller 46 is released, as the tow is then pulled by means of the rotation of the mandrel. On the other hand, by means of computer control, should the delivery head be laying-up a concave portion of the tubular body being made, the add rollers can be kept depressed, by means of the respective air cylinders, to provide an advancing movement of the tows toward the outlet of the delivery head, i.e., toward the mandrel. Otherwise, due to the concavity of the portion being laid, the tackiness of the tow could be insufficient to maintain the tow in contact with the concave portion, and the slack take-up at the creel could possibly pull the tow away from the mandrel.

Figure 15:
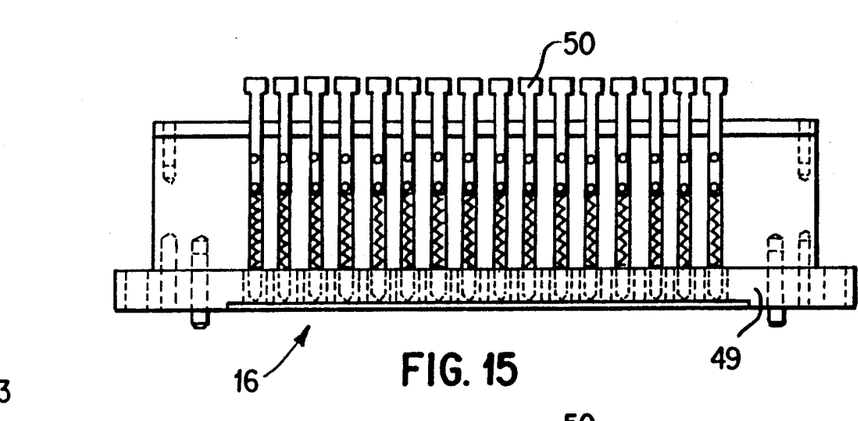
FIG. 15 is a front elevation view of the cutter assembly.
Figure 16:
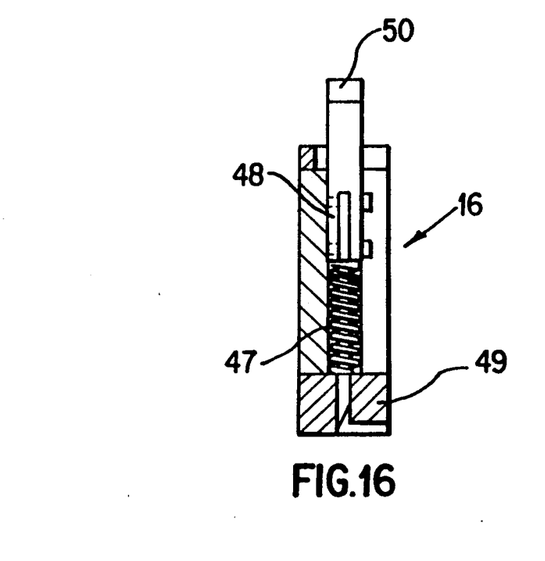
FIG. 16 is a side elevation view of the cutter assembly of FIG. 15.

Cut air cylinders 25 are located directly above the cutter module 16 of FIG. 3 when the actuation module 19 FIG. 4 is assembled onto the delivery head, as shown, e.g., in FIG. 9. The cutter module, or knife assembly, 16 is shown in greater detail in FIGS. 15 and 16. A blade 48 is provided for each tow 2 and is spring-biased away from the tow by means of a respective compression spring 47. Upon actuation of a respective air cylinder 25, the blade clamp, or blade actuator 50 is forced against the action of the compression spring, toward the tow 2 which is then cut.

Figure 6:
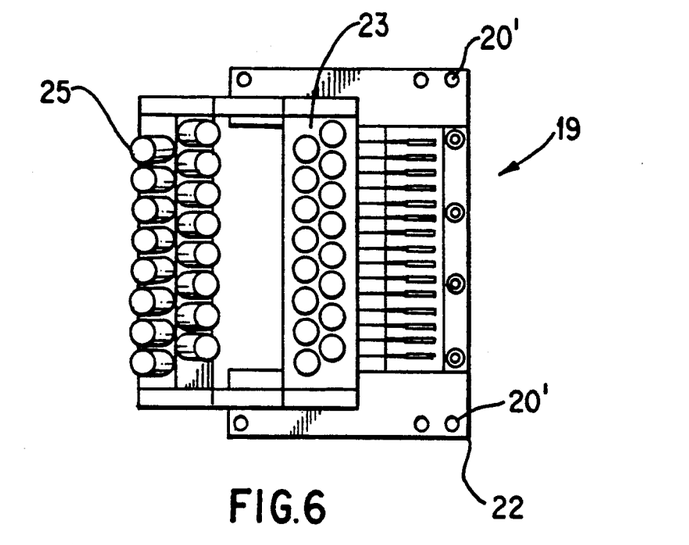
FIG. 6 is a top view of FIG. 5.

FIG. 6 shows the top of the actuation module 19 with sixteen individual add air cylinders 23 and sixteen individual cut air cylinders 25. A duplicate module is provided for use with the lower portion of the tray to thereby accommodate thirty-two individual tows.

Air is supplied to the add and cut cylinders 23, 25 from a pneumatic control system, upon receiving appropriate signals from computer 43, via flexible tubing 26, 27. Upon computer command, a valve in the control system allows air to flow through the tubing 26, 27 to the cylinders 23; 25 extending their respective piston rods and supplying the mechanical motion required for tow adding and cutting.

After being cut, each tow can be merely maintained in place by means of the aforementioned tow pinch assembly. Alternatively, to increase the efficiency of the operation, after being cut, each tow can be advanced, by means of the respective add roller, toward the forward end of the delivery head, until needed to be added back. Therefore, rather than needing to advance the previously cut tow from the cut section to forward end of the delivery head, when needed to be added back to the band 7, the cut tow can be previously positioned in a ready position at the end of the head. For this purpose, appropriate optical sensors can be utilized at the forward end of the head to actuate the pinch assembly once the tow reaches the forward end.

Figures 10, 11:
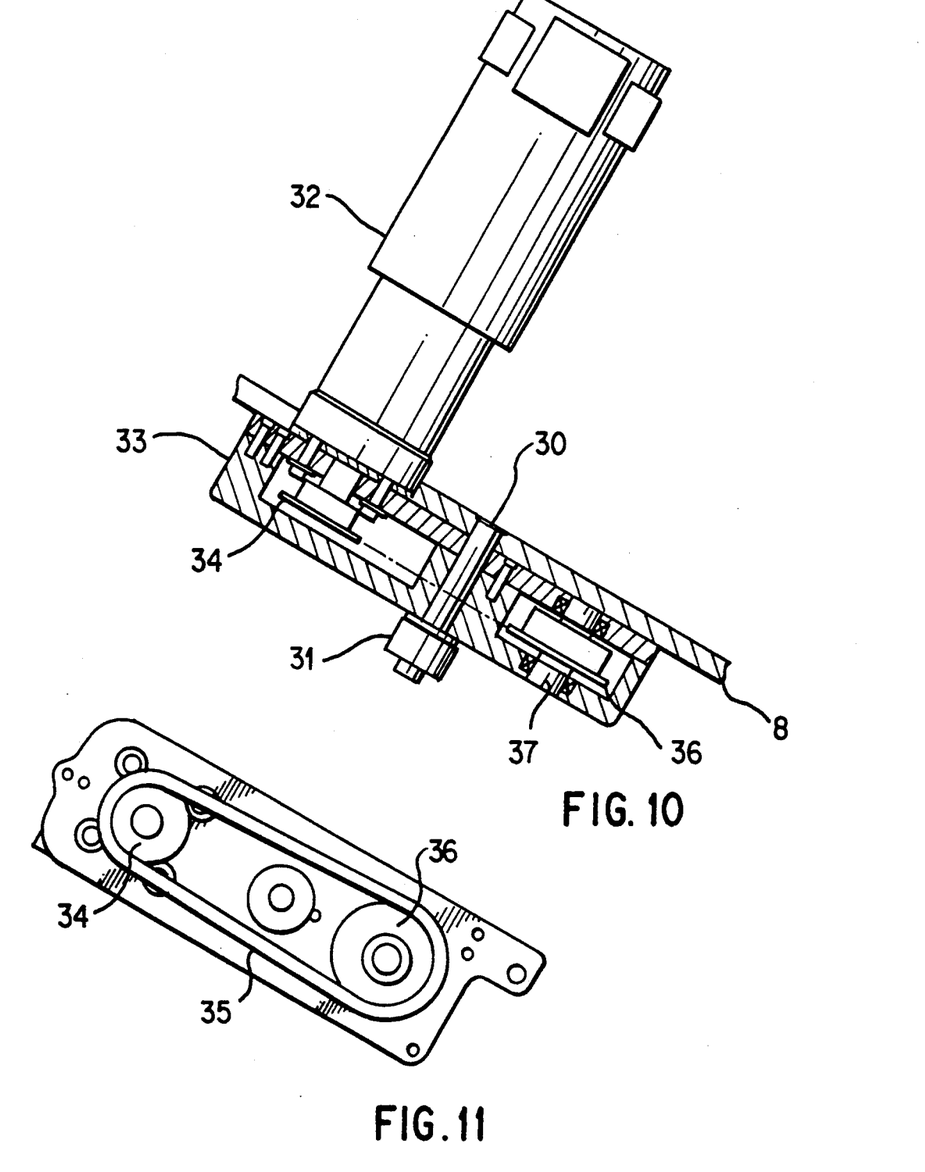
FIG. 10 is a top cross-sectional view of the quick removable drive mechanism.
FIG. 11 is a front view of FIG. 10 with the housing cover removed.

As shown in FIG. 10, a drive module is provided which is attached to the delivery head by a threaded stud 30, extending from side wall 8 of the delivery head, and a quick release knob 31, threaded upon the stud 31. By turning the knob 31, the drive mechanism is detachable from the side plate 8. The motor 32 is attached to the housing 33 of the drive mechanism. The motor sprocket 34 is mounted to the shaft of the motor 32 as it extends into the housing 33.

Figure 14:
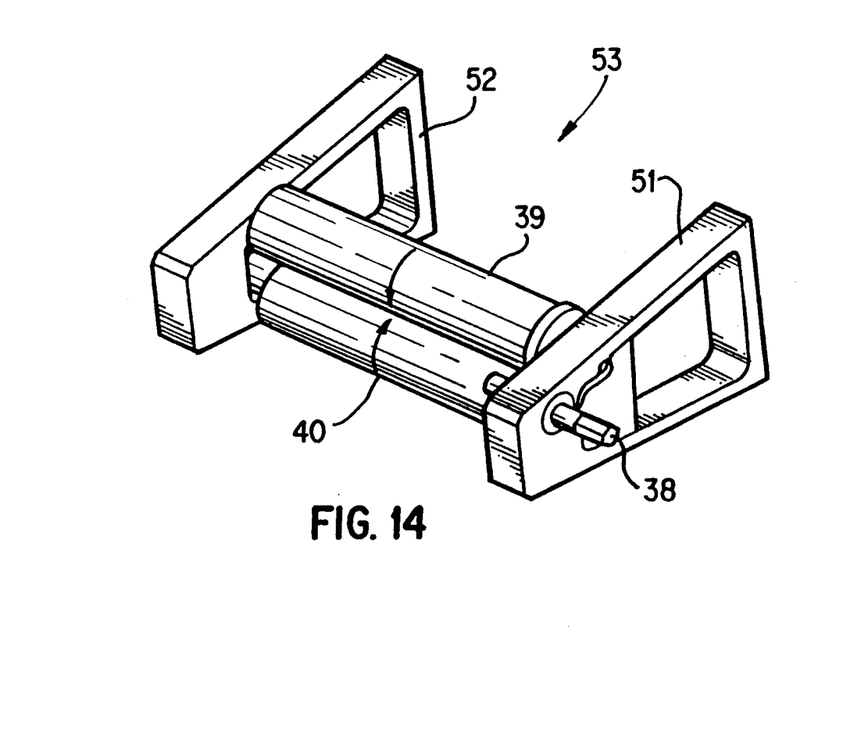
FIG. 14 is an isometric view of the add drive rollers and their drive shaft.

The housing cover 33, as shown in FIG. 10, is removed in FIG. 11, for illustrating the drive chain 35. Force is transmitted from the motor sprocket 34 through the drive chain 35 to sprocket 36. Sprocket shaft 37, shown in FIG. 10, couples with hex shaft 38, shown in FIGS. 3 and 14, to transmit force to the add drive rollers 39, 40. As shown in FIG. 14, the add drive roller assembly 53, including rollers 39, 40, is mounted in side brackets 51, 52 which are positioned in the head as shown in FIGS. 3, 4, and 9.

Figure 12:
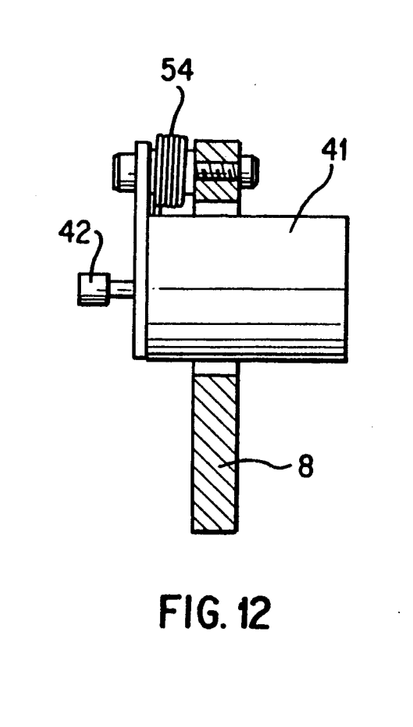
FIG. 12 is a side view of the delivery roller tachometer and spring loaded mounting.
Figure 13:
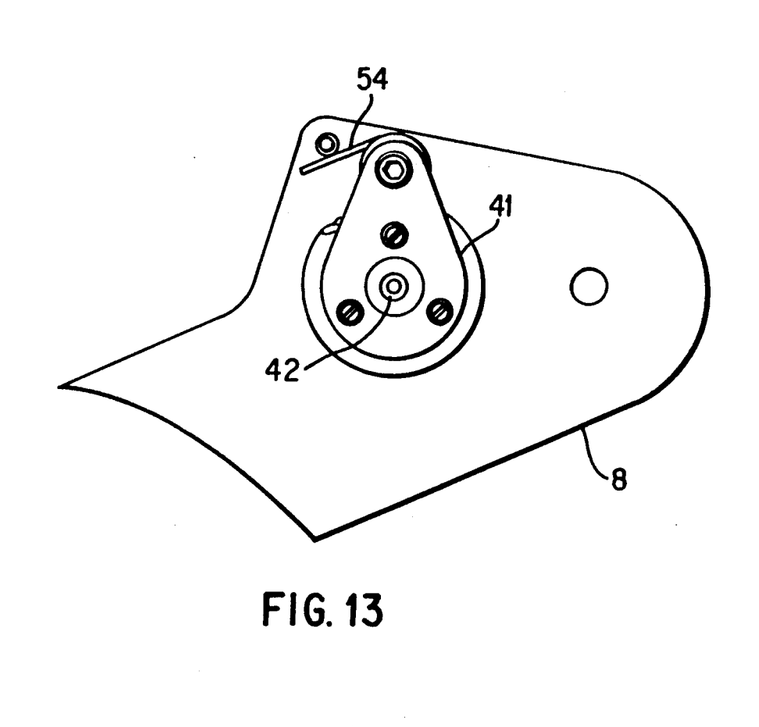
FIG. 13 is a front view of FIG. 12.

A tachometer 41 is provided for the delivery roller, shown in FIGS. 4, 12, and 13, and is mounted to and extends through the side plate 8. A gear 42, shown in FIG. 12, is attached to the tachometer shaft which engages with a gear 43, shown in FIG. 4, which is mounted on delivery roller 4. As shown in FIGS. 12 and 13, the tachometer is mounted via a torsion spring 54 for absorbing forces encountered during rotation of the delivery roller 4 during operation of the delivery head.

With the exception of certain aspects of the present invention described above, and certain specific components of the present invention, the operation of the delivery head described above is generally similar to the operation of the head of application Ser. No. 07/275,313, now U.S. Pat. No. 5,045,147 the disclosure of which is incorporated by reference thereto for this purpose, although the head described above includes certain constructional advantages aforementioned.

For example, by means of the tachometer 41 linked to the delivery roller 4, the rate of lay-up of the fiber band 7 is monitored. Thereby, the drive motor 32 of the add rollers 39, 40 is controlled for synchronization with the fiber lay-up rate. A tachometer can also be provided to monitor the speed of the drive motor 32.

The use of a position encoder is also contemplated for monitoring the displacement, or position, of the delivery roller, instead of the speed thereof, for use in controlling the driving of the drive motor.

Finally, although the invention has been described with reference of particular means, materials and embodiments, it is to be understood that the invention is not limited to the particulars disclosed and extends to all equivalents within the scope of the claims.

What is claimed is:

1. A cut/add delivery head adapted for use in a fiber placement system for winding a plurality of resin impregnated tows, forming a winding band, onto a mandrel to form an irregularly shaped object, said cut/add delivery head comprising:
   (a) a plurality of pathways for guiding a respective plurality of resin impregnated tows from an inlet to an outlet of said delivery head;
   (b) means for selectively cutting each of said plurality of tows;
   (c) means for advancing said plurality of tows toward said mandrel; and
   (d) a cut/add actuation module comprising (i) means for selectively actuating said means for selectively cutting each of said plurality of tows and (ii) means, in conjunction with said means for advancing, for effecting selective adding each of said plurality of tows, wherein the cut/add actuation module is adapted to be moved away form the twos without requiring movement of the tows, means for cutting, and means for advancing.

2. The head of claim 1, further comprising means for quickly releasing and securing said cut/add actuation module with respect to said head.

3. The head of claim 2, further comprising means for locating said cut/add actuation module on said head.

4. The head of claim 1, said means for selectively cutting each of said plurality of tows comprising a plurality of knives positioned for selective movement toward respective ones of said plurality of tows, said means for selectively actuating said means for selectively cutting each of said plurality of tows comprising a plurality of air cylinders positioned for selective actuation of respective ones of said plurality of knives.

5. The head of claim 4, said plurality of knives comprising a cutter assembly module positioned between said tows and said cut/add module.

6. The head of claim 1, said means for advancing said plurality of tows comprising a driven roller, said means for effecting selective adding of said plurality of tows comprising a plurality of camming members and a respective plurality of air cylinders positioned for selective movement of said camming members toward said driven roller.

7. The head of claim 6, said camming members comprising pinching rollers mounted in respective pivotally mounted brackets, said brackets being selectively movable toward said driven roller for pinching selective tows between respective ones of said pinch rollers and said driven roller.

8. The head of claim 4, said means for advancing said plurality of tows comprising a driven roller, said means for effecting selective adding of said plurality of tows comprising a plurality of camming members and a second plurality of air cylinders positioned for selective movement of said camming members toward said driven roller.

9. The head of claim 8, said camming members comprising pinching rollers mounted in respective pivotally mounted brackets, said brackets being selectively movable toward said driven roller by means of said second plurality of air cylinders for pinching selective tows between respective ones of said pinch rollers and said driven roller.

10. The head of claim 8, each of said air cylinders being powered through flexible tubes attached by means of quick release connectors.

11. The head of claim 1, further comprising a guide tray having a plurality of grooves for guiding respective ones of said plurality of tows.

12. The head of claim 11, said grooves having rounded and smooth entrances.

13. The head of claim 11, said grooves being covered with a polytetrafluoroethylene impregnated hard chrome coating.

14. The head of claim 11, said guide tray comprising an upper portion and a lower portion, spaced from said upper portion at said inlet of said head, said upper portion and said lower portion converging toward said outlet.

15. The head of claim 14, said upper portion of said tray and said lower portion of said tray being equal in length and being adapted to receive said tows at equal angles.

16. The head of claim 14, said upper portion of said tray and said lower portion of said tray being unitary.

17. The head of claim 14, said upper portion of said tray having a plurality of said grooves for guiding substantially one-half of said plurality of tows, and said lower portion of said tray having a plurality of said grooves for guiding substantially one-half of said plurality of tows, a respective said cut/add actuation module being mounted upon each of said upper portion and said lower portion of said tray.

18. The head of claim 1, further comprising a delivery roller and a tachometer for monitoring speed of fiber placement upon said mandrel.

19. The head of claim 18, said drive module further comprising a drive motor and a controller for said drive motor, said controller adapted to synchronize speed of said drive motor to speed of said delivery roller as a function of signals received from said tachometer.

20. The head of claim 19, further comprising a second tachometer linked to said drive motor for monitoring speed of said motor.

21. The head of claim 1, further comprising a delivery roller and a position encoder for monitoring rotary position of said delivery roller.

22. The head of claim 21, said drive module further comprising a drive motor and a controller for said drive motor, said controller adapted to control speed of said drive motor as a function of signals received from said position encoder.

23. The head of claim 1, further comprising a tow pinch module.

24. The head of claim 23, said tow pinch module comprising a plurality of air-actuated cylinders removable as a unit from said head.

25. The head of claim 1, wherein the cut/add actuation module comprises a unit mounted to the cut/add delivery head as one piece.

26. The head of claim 4, wherein the plurality of air cylinders are arranged in alignment with the cutter module when the cut/add actuation module is assembled onto the cut/add delivery head.

27. A cut/add delivery head adapted for use in a fiber placement system for winding a plurality of resin impregnated tows, forming a winding band, onto a mandrel to form an irregularly shaped object, said cut/add delivery head comprising:
(a) a plurality of pathways for guiding a respective plurality of resin impregnated tows from an inlet to an outlet of said delivery head;
(b) means for selectively cutting each of said plurality of tows;
(c) means for advancing said plurality of tows toward said mandrel, said means for advancing said plurality of tows comprising a roller used to feed the tows to the mandrel driven by a drive module affixed to said head by means of a single quick release knob; and
(d) a cut/add actuation module comprising (i) means for selectively actuating said means for selectively cutting each of said plurality of tows and (ii) means, in conjunction with said means for advancing, for effecting selective adding each of said plurality of tows.

28. The head of claim 27, further comprising a threaded stud projecting from said head, said drive module further comprising a housing affixed to said head by means of said quick release knob being threaded on said stud.

29. A cut/add delivery head adapted for use in a fiber placement system for winding a plurality of resin impregnated tows, forming a winding band, onto a mandrel to form an irregularly shaped object, said cut/add delivery head comprising:

(a) a plurality of pathways for guiding a respective plurality of resin impregnated tows from an inlet to an outlet of said delivery head;
(b) means for selectively cutting each of said plurality of tows;
(c) means for advancing said plurality of tows toward said mandrel, said means for advancing said plurality of tows comprising a roller used to feed the tows to the mandrel driven by a drive module affixed to said head by means of a single quick release knob; and
(d) a cut/add actuation module comprising (i) means for selectively actuating said means for selectively cutting each of said plurality of tows and (ii) means, in conjunction with said means for advancing, for effecting selective adding each of said plurality of tows, wherein the cut/add actuation module is adapted to be moved away form the tows without requiring movement of the tows.

* * * * *

UNITED STATES PATENT AND TRADEMARK OFFICE
CERTIFICATE OF CORRECTION

PATENT NO. : 5,290,389
DATED : March 1, 1994
INVENTOR(S) : Boyd L. Htach, et. al.

It is certified that error appears in the above-indentified patent and that said Letters Patent is hereby corrected as shown below:

Column 8, line 66, claim 1, "twos" should be --tows--.

Signed and Sealed this

Twenty-eighth Day of June, 1994

Attest:

BRUCE LEHMAN

Attesting Officer     Commissioner of Patents and Trademarks